Nov. 4, 1952     J. D. WALKER     2,616,676
AERATOR

Filed July 18, 1947     2 SHEETS—SHEET 1

Inventor
James Donald Walker
By:- Louis Robertson
Atty.

Nov. 4, 1952 J. D. WALKER 2,616,676
AERATOR
Filed July 18, 1947 2 SHEETS—SHEET 2
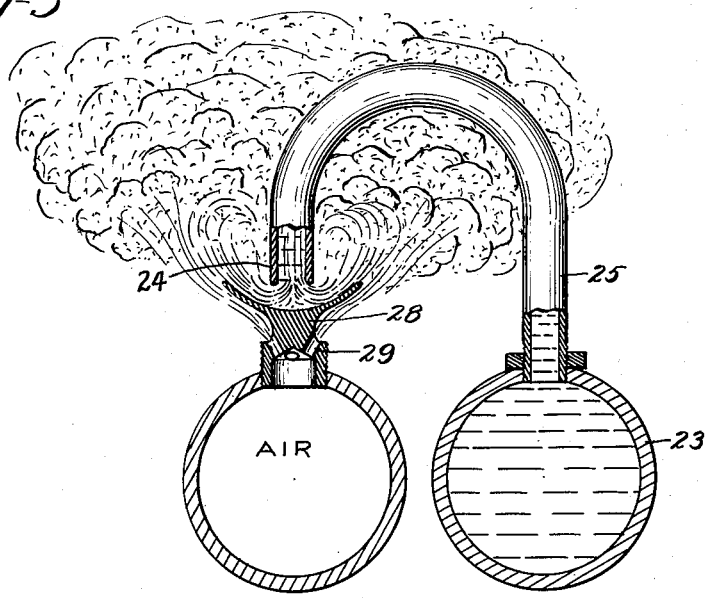
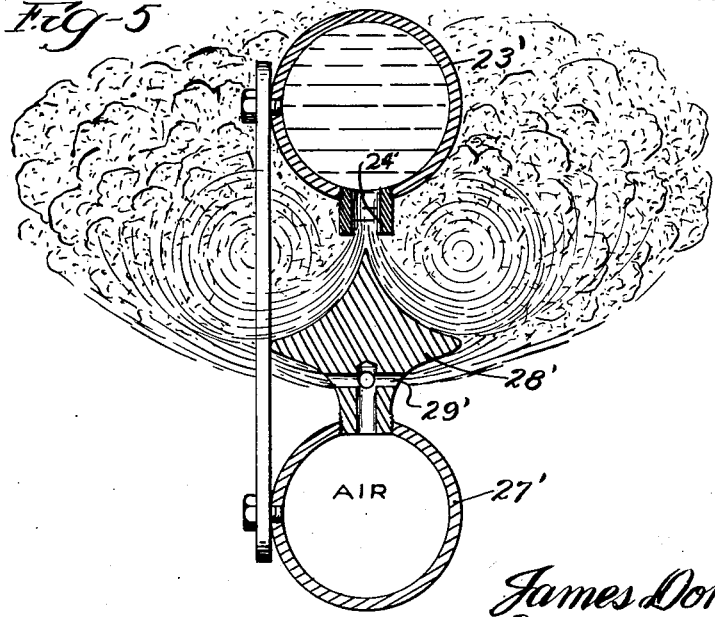
Inventor
James Donald Walker
By:- Louis Robertson Atty.

Patented Nov. 4, 1952

2,616,676

UNITED STATES PATENT OFFICE 2,616,676

AERATOR

James Donald Walker, Aurora, Ill., assignor to Walker Process Equipment, Inc., Aurora, Ill., a corporation of Illinois Application July 18, 1947, Serial No. 761,839

10 Claims. (Cl. 261—124)

In treating sewage, it is often necessary to dissolve large quantities of air or oxygen in the sewage and at the same time gently agitate the sewage to flocculate the solids therein and to provide adequate mixing. Heretofore, one of the common methods of accomplishing these results involved the provision of porous diffusion members near the bottom of a tank of sewage, air being supplied to the sewage by forcing compressed air through the porous members. The rising air bubbles would agitate the sewage, as well as aerate it. This has been a relatively expensive method of aeration inasmuch as considerable power was required to compress the necessary air, enough excessive pressure over the water pressure being required to force the air through the porous members in sufficient quantities to do the job. Only a small percentage of the air was dissolved, the bubbles being fairly large. Furthermore, the porous members gradually became clogged so that there was substantial maintenance cost.

More recently, an improved system of aeration and agitation has involved pumping some of the liquid from the tank through pipes leading to jets and pumping air through the same jet, the air and water being mixed together in the process. The fairly large size of the jet orifices substantially eliminated clogging due to particles in the air and greatly reduced the maintenance. However, this method required a jet orifice small enough to be clogged occasionally by the solid materials in the liquid. Furthermore, since both the air and water pumping pressures had to be substantially higher than the hydrostatic pressure of the surrounding water, operational costs were still fairly high.

According to the present invention, an improved aerator is provided which permits a lower water pumping pressure and much lower air pressure, the two streams being emitted separately in such a way that they come together in a manner to produce good mixing thereof. Multitudinous small or pin-point sized bubbles are produced so that a relatively high percentage of the available oxygen in the air is dissolved. Obstruction of the orifice is virtually eliminated by the large size of the liquid orifice and operating costs are very low.

This application is in part a continuation of Serial No. 689,779, filed August 10, 1946, now abandoned.

Additional objects and advantages of the invention will be apparent from the following description and from the drawings, in which:

Fig. 3 is a sectional view on a larger scale taken through the aerator unit of Fig. 1.

Fig. 4 is a perspective view of the impinger of Fig. 3.

Fig. 5 is a view similar to Fig. 3, but showing a modification.

Figure 1:
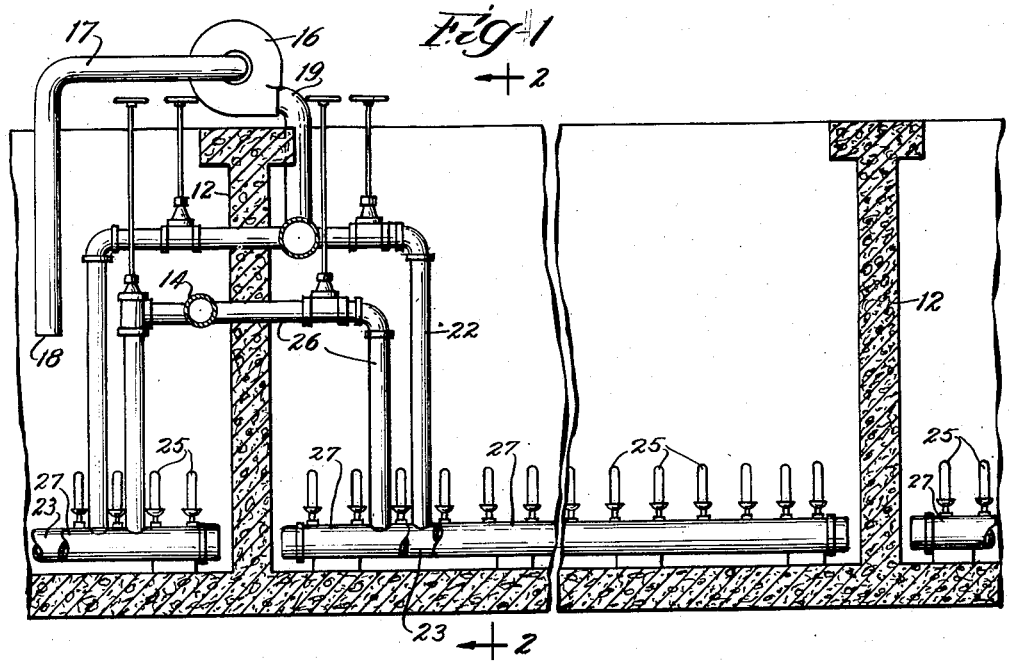
Figure 1 is a fragmentary and somewhat diagrammatic illustration of sewage treating apparatus embodying the present invention.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The form of the invention chosen for illustration is shown in connection with a sewage treatment tank 11 which could, for example, be part of an activated sludge treatment plant. The tank may include one or more dividing walls 12. A pipe 14 for the supply of compressed air from a suitable pump or blower not shown may extend longitudinally of the tank 11. If wall 12 is shaped with a trough along its top, pipe 14 may lie in the trough. A centrifugal pump 16 is carried by the wall 12 at the top thereof. This pump is of a type adapted to pump the sewage from which the solids have been settled without becoming obstructed. The intake side of the pump is connected through pipe 17 to an intake opening 18 positioned well below the top of the tank, and preferably away from rising air streams so as to draw in relatively solid (air free) water. There is some preference for drawing water from near the outlet end of the tank or preferably the middle so that raw sewage will be avoided. The outlet 19 of the pump is connected through pipes 21 and 22 to headers 23, each of which may be provided with a plurality of U-shaped pipes 25 terminating in orifices 24 for producing downwardly directed jets of water.

The air supply 14 is connected by pipes 26 with air headers 27, each of which is provided with a plurality of orifice and stream-mixing members 28, which may be called impingers, seen best in Fig. 3. The impingers are located near the bottom of the tank. The supply pipes 21, 22 and 26 may be relatively larger than shown.

As seen in Fig. 3, the axis of the mixing member 28 is aligned with the axis of the orifice 24. The mixing member 28 is shaped to spread the water jet from orifice 24 into a thin sheet extending all around mixing member 28.

At the same time, air which is liberated through orifices 29 tends to pass upwardly along the lower surface of mixing member 28 so that it comes into contact with the diverging water jet. As the thin sheet of water leaves the mixing member or impinger 28 air is sheared off in tiny droplets and thoroughly mixed with the water stream and ultimately, of course, with the entire body of sewage.

In addition to relatively local agitating action of the radially diverging water stream, the air which is thus mixed with the sewage reduces the weight of the portion of the sewage in the vicinity of the jet so that this portion of the sewage tends to rise and thus the entire body of sewage is gently agitated.

The mixing member 28 may be made of bronze or other non-corrosive metal and may take a wide variety of shapes, that shown in Figs. 3 and 4 at present being preferred, it being understood that the horizontal cross-section of the mixing member is circular at all points above the orifice 29. This shape seems to induce a horizontally disposed ring of swirling water and air above the member 28, the movement following a circular path, in each radial plane, upwardly and inwardly from the rim of member 28. Apparently this produces a multiple shearing action which produces a maximum proportion of fine bubbles. Some experimenters believe the member 28 works best cupped side down, with water striking its convex side. Shapes which have also been found to work quite well, even if not quite as efficiently as that shown in Figs. 3 and 4, include the shape shown in Fig. 5 and shapes with more true conical surfaces on both sides, and a plate-like shape, substantially flat on both sides. Any surface imparts turbulence to water flowing against it so that air which is drawn into the stream, even from a jet thereabove and beyond the stream from the surface, is partially broken up. Of course, some of the advantages could be obtained, although less efficiently, by directing a flat jet of water directly from a nozzle and flowing air into it from below. Both illustrated forms of the invention are much superior, particularly in that each provides a very large area of interaction between the water and the air with a single medium-sized water orifice, large enough so it will virtually never clog. The thin edge between the water stream and the air stream assists the water in shearing from the air small bubbles, smaller than would separate by buoyancy alone.

In Fig. 5, parts corresponding to parts in Fig. 3 have been given like numbers but with primes.

It is expected that when treating liquor carrying 2,000 parts per million of activated sludge, the oxygen absorption will be about 20%, thus requiring only about one-third or one-fourth the air required by conventional diffusers.

With the illustrated forms of the invention, air pressure which is only minutely above the static water pressure surrounding the orifice has been found sufficient. Water pressure in headers 23 of three to four pounds per square inch over surrounding hydrostatic pressure has been found sufficient. This pressure is sufficient to make the water flow over the impinger fast enough to shear tiny bubbles of air from it. The jet aerator, known heretofore, has required 25 pounds per square inch water pressure and an air pressure of 2½ pounds in excess of the surrounding hydrostatic pressure.

The volume of air required is about five, or possibly as low as three, cubic feet per minute per thousand cubic feet of tank volume, or about .25 cubic foot per U. S. gallon of sewage supplied for treatment. A blower capacity of .5 cubic foot per U. S. gallon of sewage supplied for treatment is preferred to allow for variations and reserve. The pump 16 is designed to pump from 2 to 2.5 U. S. gallons per minute per cubic foot of air.

The oxygen absorption with this aerator is about 20 to 40 percent under conditions comparable to those yielding 3 to 5 percent oxygen absorption with No. 30 diffusion plate or tube aerators, so that not over one-sixth of the air is required for comparable oxygenation. This is probably due to the pin-point size of the bubbles, which are so small that they continue to break the surface long after the aerator has been shut off. The non-clogging characteristics of the aerator make unnecessary air filters and liquid strainers (except conventional coarse screens at the plant inflow). The smallest water orifices are over three-eighths inch in diameter, preferably one-half inch.

Figure 2:
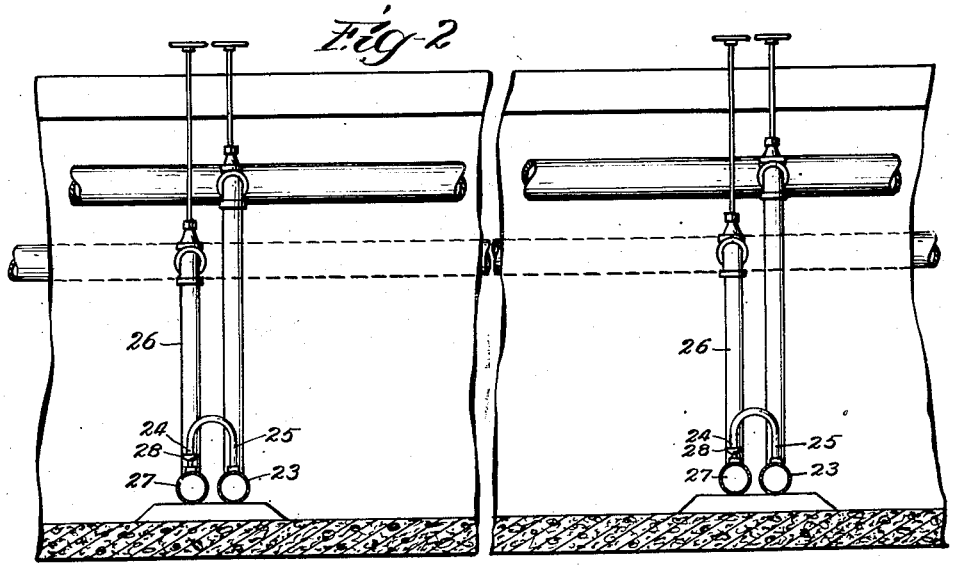
Fig. 2 is a similar view taken approximately on the line 2—2 of Fig. 1.

The aerators of this invention may be disposed in the tank in any suitable arrangement, such as those which have been used heretofore for other types of aerators. It is preferred, however, to use the arrangement illustrated in Figs. 1 and 2. Here the aerators are arranged in spaced lines extending across the tank, near the bottom thereof. The lines must be spaced apart far enough to enable the rising air to impart a rolling swirl to the whole depth of the liquid, or two such swirls in opposite directions. The preferred spacing is twice the depth of the tank. This general arrangement has two advantages over the more common arrangement of the aerators along the sides of the tanks. One is that short-circuiting of the sewage through the tank without adequate aeration is prevented. The other is that a smaller amount of air will accomplish adequate agitation of the sewage, because friction is reduced. A relatively small part of the swirl is along the wall of the tank. Where two successive swirls meet, they are moving in the same vertical direction, so there is no friction between them, adjacent swirls rotating in opposite directions, as do meshing gears. Of course other types of aerators could be disposed in like manner with a similar advantage in this respect.

From the foregoing it is seen that an exceptionally efficient type of aerator has been provided in which streams of air and water come together in a tank of water in a manner to break the air into minute bubbles, mix it thoroughly with the water stream and agitate the contents of the tank. The aeration and agitation of the contents of the tank are exceptionally economical in both operating and maintenance costs. Although the description has referred particularly to sewage, the invention could be used for aerating other liquids. The term "aerating" is not intended to be limited to air, as other gas could be supplied through the air orifices. Likewise, a water orifice may be used for other liquids.

I claim:

1. An impingement gasifying device for submergence in a body of liquid, including a member providing a liquid orifice having an unobstructed opening over three-eighths inch in diameter, means for supplying liquid under pressure thereto, gas-liberation means providing a gas orifice positioned opposite the liquid orifice, means for supplying gas under pressure thereto, and a stationary mixing member between the two orifices cupped toward the liquid orifice to spread the liquid jet from the liquid orifice into a generally radially diverging stream and deliver it in the form of a thin sheet surrounding the orifice, and shaped to direct the gas from the gas orifice into the sheet.

2. Impingement gasifying apparatus including a liquid pump, inlet means for said pump communicating with a liquid tank, outlet means for said pump including a generally horizontal liquid conduit, a plurality of liquid orifice members communicating with said conduit approximately at the bottom thereof and positioned in said tank below the liquid level thereof, a deflecting member free from mechanical drive and positioned in front of each of said orifices to spread the stream issuing therefrom and impart turbulence thereto, a pump for a gaseous substance, a discharge conduit for said pump and a plurality of additional orifice members communicating with said discharge conduit and positioned to liberate the gaseous substance in the liquid in said tank at a position to be entrained in said turbulent stream.

3. Gasifying apparatus including a tank, liquid circulating means including a pump as its only part normally having movement, an intake structure in the tank communicating with the inlet side of the pump, a series of orifice members along a line in and near the bottom of the tank spaced above the bottom of the tank and communicating with the outlet side of said pump, impingement members opposite the outlets of the orifice members and facing the outlets to spread the streams therefrom radially into thin sheets, and gas liberating means providing a plurality of small openings for each outlet positioned to liberate gas bubbles opposite said outlets to be caught by said sheets and immediately dispersed throughout the thickness of said sheets, and to be carried throughout a large area of the tank by tank-deep swirls produced by the lifting effect of the gas; the liquid circulating means being incapable of projecting a stream which by its momentum will carry the gas throughout said area of the tank.

4. Gasifying apparatus including a tank, liquid circulating means including a pump as its only part normally having movement, an intake structure in the tank communicating with the inlet side of the pump, a series of orifice members along a line in and near the bottom of the tank, each having an unobstructed diameter of the order of one-half inch and communicating with the outlet side of said pump, impingement members opposite the outlets of the orifice members and facing the outlets to spread the streams therefrom radially into thin sheets, and gas liberating means providing a plurality of small openings for each outlet positioned to liberate gas bubbles opposite said outlets to be caught by said sheets and immediately dispersed throughout the thickness of said sheets, and to be carried throughout a large area of the tank by tank-deep swirls produced by the lifting effect of the gas.

5. Impingement gasifying apparatus for submergence in a body of liquid including a member providing a water orifice having an unobstructed diameter of the order of one-half inch, means for supplying liquid under pressure to said member, a spreader symmetrically facing said orifice to spread the stream flowing therefrom into a thin sheet-like stream flowing generally radially from the axis of the spreader at all angles about said axis, and means for liberating gas adjacent said stream to be entrained in the sheet-like portion thereof and sheared by it into tiny bubblets and immediately dispersed throughout its thickness.

6. Impingement gasifying apparatus including a liquid pump, inlet means for said pump communicating with a liquid tank, outlet means for said pump including a generally horizontal liquid conduit, a plurality of liquid orifice members communicating with said conduit and positioned in said tank below the liquid level thereof, a deflecting member free from mechanical drive and positioned in front of each of said orifices to spread the stream issuing therefrom and impart turbulence thereto, a pump for a gaseous substance, a discharge conduit for said pump; said apparatus having a plurality of orifices communicating with said discharge conduit and positioned to liberate the gaseous substance in the liquid in said tank at a position to be entrained in said turbulent stream.

7. An elongated waste treatment tank adapted for the longitudinal flow of watery waste and aerating means having air-liberation portions arranged transversely of the tank along transversely extending lines sufficiently separated longitudinally of the tank to produce successive swirls in opposite directions about transverse axes, each swirl extending through the depth of the tank contents.

8. An elongated waste treatment tank adapted for the longitudinal flow of watery waste and aerating means having air-liberation portions arranged transversely of the tank along transversely extending lines sufficiently separated longitudinally of the tank to produce successive swirls in opposite directions about transverse axes, each swirl extending through the depth of the tank contents, the air-liberating means being so disposed along each line as to provide a substantially continuous curtain of rising air bubbles across the width of the tank.

9. An elongated waste treatment tank adapted for the longitudinal flow of watery waste and aerating means having air-liberation portions arranged transversely of the tank at a continuous succession of closely spaced points all along each of a plurality of transversely extending lines sufficiently separated longitudinally of the tank to produce successive swirls in opposite directions about transverse axes, each swirl extending through the depth of the tank contents.

10. An elongated waste treatment tank adapted for the longitudinal flow of watery waste and aerating means having air-liberation portions arranged transversely of the tank at a continuous succession of closely spaced points all along a transversely extending line so spaced longitudinally of the tank as to produce successive swirls in opposite directions about transverse axes, each swirl extending through the depth of the tank contents.

J. DONALD WALKER.

REFERENCES CITED

The following references are of record in the file of this patent:

UNITED STATES PATENTS

| Number | Name | Date |
|---|---|---|
| 721,036 | Gwynne et al. | Feb. 17, 1903 |
| 1,223,033 | Cole | Apr. 17, 1917 |
| 1,641,394 | Martin | Sept. 6, 1927 |
| 1,985,153 | Daman | Dec. 18, 1934 |
| 2,040,941 | Jones et al. | May 19, 1936 |
| 2,097,605 | Schierenbeck | Nov. 2, 1937 |
| 2,438,342 | Mallory | Mar. 23, 1948 |

FOREIGN PATENTS

| Number | Country | Date |
|---|---|---|
| 458,583 | Great Britain | Dec. 23, 1936 |
| 727,315 | Germany | Oct. 31, 1942 |
| 571,525 | France | Feb. 4, 1924 |